US009349531B2

(12) United States Patent
Herglotz et al.

(10) Patent No.: US 9,349,531 B2
(45) Date of Patent: May 24, 2016

(54) DEVICE FOR TRANSMITTING ELECTRIC POWER FROM A WALL TO A WING FASTENED TO SAID WALL IN A HINGED MANNER

(75) Inventors: Tibor Herglotz, Kreuzau (DE); Ingo Steinfeld, Langenfeld (DE); Wolfgang Staude, Waldeck (DE)

(73) Assignee: DR. HAHN GMBH & CO. KG, Moenchengladbach-Wickrath (DE)

( * ) Notice: Subject to any disclaimer, the term of this patent is extended or adjusted under 35 U.S.C. 154(b) by 534 days.

(21) Appl. No.: 13/823,741

(22) PCT Filed: Sep. 29, 2011

(86) PCT No.: PCT/EP2011/066997
§ 371 (c)(1),
(2), (4) Date: Mar. 15, 2013

(87) PCT Pub. No.: WO2012/045657
PCT Pub. Date: Apr. 12, 2012

(65) Prior Publication Data

US 2013/0181542 A1 Jul. 18, 2013

(30) Foreign Application Priority Data

Oct. 4, 2010 (DE) ..................... 20 2010 008 711 U

(51) Int. Cl.
*H01F 27/42* (2006.01)
*H01F 37/00* (2006.01)
(Continued)

(52) U.S. Cl.
CPC ................ *H01F 38/14* (2013.01); *E05D 11/00* (2013.01); *E05D 11/0081* (2013.01); *H01F 38/18* (2013.01); *E05Y 2400/66* (2013.01); *E05Y 2800/00* (2013.01)

(58) Field of Classification Search
CPC .............. H01F 38/14; H01F 2038/143; H01F 2038/146; H01F 27/2871; H01F 27/306; H01F 38/18; H01F 7/0231
USPC .......................................................... 307/104
See application file for complete search history.

(56) References Cited

U.S. PATENT DOCUMENTS 4,424,469 A * 1/1984 Shahbender .......... H02M 3/335 315/411
4,806,928 A * 2/1989 Veneruso .............. E21B 17/003 175/40

(Continued)

FOREIGN PATENT DOCUMENTS

DE 39 15 812 A1 11/1990
DE 93 02 652 U1 8/1994

(Continued)

*Primary Examiner* — Jared Fureman
*Assistant Examiner* — Esayas Yeshaw
(74) *Attorney, Agent, or Firm* — Norman B. Thot

(57) ABSTRACT

A device for transmitting electrical power from a wall to a wing attached thereto about a hinge axis includes a wall part fastened to the wall. A wing part is fastened to the wing. A primary coil arranged on the wall part comprises an end side, a primary coil winding and a primary coil housing with ferromagnetic or ferrimagnetic properties. The primary coil housing is open on an end side facing the wing part and substantially covers the primary coil winding on an opposite end side. A secondary coil arranged on the wing part comprises a secondary coil winding and a secondary coil housing with ferrimagnetic or ferromagnetic properties. The secondary coil housing is open on an end side facing the wall part and substantially covers the secondary coil winding on an opposite end side. The end sides of the primary coil and the secondary coil face each other.

14 Claims, 5 Drawing Sheets

(51) Int. Cl.

| | |
|---|---|
| ***H01F 38/00*** | (2006.01) |
| ***H01F 38/14*** | (2006.01) |
| ***E05D 11/00*** | (2006.01) |
| ***H01F 38/18*** | (2006.01) |

(56) References Cited

U.S. PATENT DOCUMENTS

| | | | | |
|---|---|---|---|---|
| 5,161,702 | A * | 11/1992 | Skalski | A47F 1/126 211/43 |
| 6,409,517 | B2 * | 6/2002 | Malnati | 439/38 |
| 7,752,713 | B2 * | 7/2010 | Stura | E05D 3/16 16/386 |
| 8,650,714 | B2 * | 2/2014 | Staude | E05D 11/0081 16/385 |
| 2002/0118559 | A1 * | 8/2002 | Kurokami | H02M 1/15 363/131 |
| 2006/0132273 | A1 | 6/2006 | Shinmen et al. | |
| 2008/0078462 | A1 * | 4/2008 | Minervini | F16K 37/0058 137/625.64 |
| 2009/0323232 | A1 * | 12/2009 | Suzuki | H02M 1/32 361/23 |
| 2010/0215390 | A1 * | 8/2010 | Tomita | G03G 15/2039 399/69 |
| 2012/0017396 | A1 | 1/2012 | Meyer | |
| 2012/0066864 | A1 | 3/2012 | Boegel-Poetter et al. | |
| 2012/0242165 | A1 | 9/2012 | Herglotz et al. | |

FOREIGN PATENT DOCUMENTS

| | | | |
|---|---|---|---|
| DE | 10 2004 017 341 | A1 | 1/2005 |
| DE | 20 2008 014 318 | U1 | 4/2010 |
| EP | 1 888 866 | B1 | 2/2009 |
| GB | 2 394 506 | A | 4/2004 |
| JP | 2001-57744 | A | 2/2001 |
| WO | WO 2010/049292 | A1 | 5/2010 |
| WO | WO 2010/139515 | A1 | 12/2010 |
| WO | WO 2011/067010 | A2 | 6/2011 |

* cited by examiner

DEVICE FOR TRANSMITTING ELECTRIC POWER FROM A WALL TO A WING FASTENED TO SAID WALL IN A HINGED MANNER

CROSS REFERENCE TO PRIOR APPLICATIONS

This application is a U.S. National Phase application under 35 U.S.C. §371 of International Application No. PCT/EP2011/066997, filed on Sep. 29, 2011 and which claims benefit to German Patent Application No. 20 2010 008 711.2, filed on Oct. 4, 2010. The International Application was published in German on Apr. 12, 2012 as WO 2012/045657 A1 under PCT Article 21(2).

FIELD

The present invention relates to a device for transmitting electrical power from a wall to a wing attached to said wall in a hinged manner about a hinge axis.

BACKGROUND

Hinges serving for a hinged connection of a wing to a wall have been described, for example, in DE 93 02 652 U1. They have proven their worth many times in different technical configurations and are also used on doors for objects such as houses, businesses or on escape doors.

Such doors increasingly comprise devices that improve safety or comfort and are operated by means of electrical energy.

For energy supply, these devices are connected to an external energy source via flexible cables.

These cable connections significantly impair the visual appearance and can be trapped between the wing and the wall, which can result in damage to, or even destruction of, the cables.

DE 10 2004 017 341 A1 describes a hinge that has a built-in transformer for contactless energy transmission. This hinge comprises a primary coil arranged in a frame hinge part and a secondary coil arranged in a wing hinge part. For the magnetic coupling of the secondary coil to the primary coil, which are spaced apart from each other in the direction of the hinge axis, an iron core is provided which penetrates both coils and which is formed by a hinge bolt.

Contactless energy transmission from a fixed frame into a wing pivotably arranged on the frame is in principle desirable for avoiding the above-mentioned disadvantages; however, tests have shown that the hinge described in DE 10 2004 017 341 A1 only transmits very low electrical power outputs from the primary coil to the secondary coil.

SUMMARY

An aspect of the present invention is to provide a device for transmitting electrical energy from a wall to a wing attached to said wall in a hinged manner about a hinge axis so as to achieve a contactless transmission of electrical energy at least with a power output as needed for charging an electrical energy storage device and/or for an electrical consumer.

In an embodiment, the present invention provides a device for transmitting electrical power from a fixed wall to a wing attached to the fixed wall in a hinged manner about a hinge axis which includes a wall part configured to be fastened to the fixed wall. A wing part is configured to be fastened to the wing. A primary coil is arranged on the wall part. The primary coil comprises an end side, a primary coil winding and a primary coil housing with ferromagnetic or ferrimagnetic properties. The primary coil housing is configured to be open on an end side facing the wing part and to substantially cover the primary coil winding on an opposite end side. A secondary coil is arranged on the wing part. The secondary coil comprises a secondary coil winding and a secondary coil housing with ferrimagnetic or ferromagnetic properties. The secondary coil housing is configured to be open on an end side facing the wall part and to substantially cover the secondary coil winding on an opposite end side. The end side of the primary coil and the end side of the secondary coil are arranged so as to face each other.

BRIEF DESCRIPTION OF THE DRAWINGS

The present invention is described in greater detail below on the basis of embodiments and of the drawings in which.

DETAILED DESCRIPTION

Figure 1:
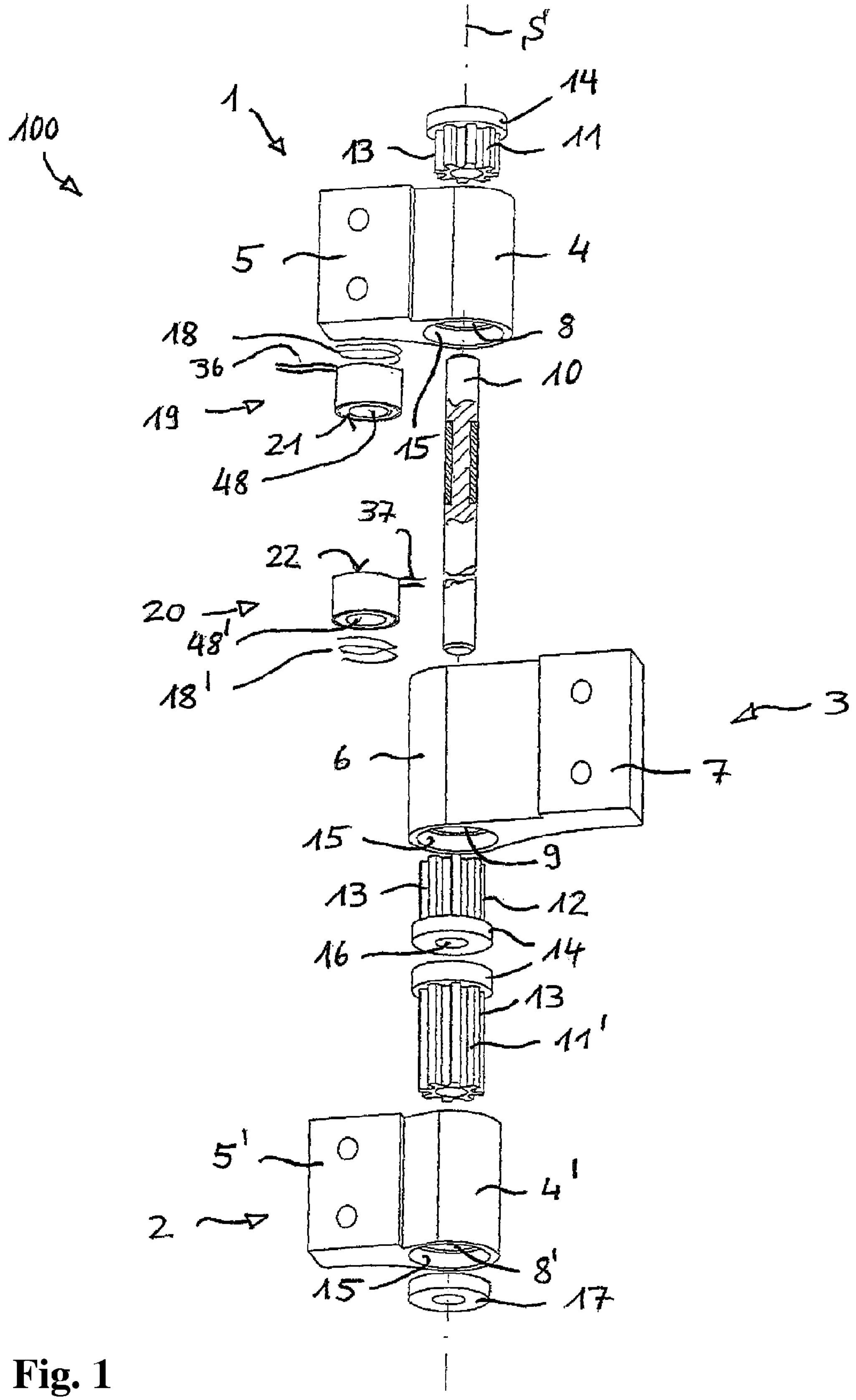
FIG. 1 shows an exploded illustration of an exemplary embodiment of a device according to the present invention which assumes at the same time the function of a conventional hinge.

The device according to the present invention for transmitting electrical power from a fixed wall into a wing attached to the wall in a hinged manner about a hinge axis thus has a wall part that can be fastened to the wall, a wing part that can be fastened to the wing, a primary coil provided on the wall part and a secondary coil provided on the wing part.

In order to improve the inductive coupling of the secondary coil to the primary coil, the primary coil can, for example, comprise a primary coil winding and a primary coil housing that has ferrimagnetic or ferromagnetic properties and, for example, contains a ferrimagnetic or ferromagnetic material. The primary coil housing is open on the end side facing the wing part and at least almost completely covers the coil winding on the opposite end side. The secondary coil comprises a secondary coil winding and a secondary coil housing that has ferrimagnetic or ferromagnetic properties and, for example, comprises a ferrimagnetic or ferromagnetic material. The secondary coil housing is open on the end side facing the wall part and at least almost completely covers the coil winding on the opposite end side.

It has surprisingly been found that with this arrangement, a particularly effective inductive coupling of the secondary coil to the primary coil is achieved so that with respect to the arrangement previously described in DE 10 2004 017 341 A1, considerably higher electrical power can be transmitted from the primary to the secondary coil with approximately the same coil dimensions.

For improving the coupling and also for making winding the coil easier, a primary coil housing and/or a secondary housing can, for example, have an inner cylindrical jacket surface around which the primary coil winding or, respectively, the secondary coil winding is wound.

For further improving the inductive coupling of the secondary coil to the primary coil (and also for making the coils more resistant to external influences), it can also be advantageous if the primary coil housing and/or the secondary coil housing comprises an outer jacket surface that is arranged concentric to the inner jacket surface. The coil windings are then protectively surrounded by the inner and the outer jacket surfaces and the closed end sides.

The primary coil housing and/or the secondary coil housing can, for example, be formed in each case in one piece from a plastic-containing ferrimagnetic and/or ferromagnetic particles. Such a housing is, in particular, characterized by its properties of conducting magnetic flux and improving the inductive coupling of the coils. Such a housing can at the same time assume functions of a sliding bearing if the plastic used is a bearing material.

The ferrimagnetic and/or ferromagnetic particles can consist of different materials. The selection of the materials is substantially determined by the frequency of the primary voltage. The use of manganese-zinc-ferrite material has led to good results if the voltage is in the range of approximately 50 kHz.

The coil housings can also comprise electrically-conductive shielding on their outer sides. These shields reduce the risk that external electromagnetic fields negatively influence the transmission. It is also prevented that electromagnetic waves are emitted through the inductive transmission and, for example, can interfere with radio-operated equipment in the proximity of the device.

Said shielding can comprise electrically conductive coats or layers which are provided on the outer surfaces of the coil housing and exhibit such properties. "Coat" is here to be understood as a material layer that is firmly connected to the respective outer surface, whereas "layer" means a self-supporting configuration or layer, for example, in the form of a casing.

It has proven advantageous to use alternating current voltage of from 20 kHz to 150 kHz as a primary voltage. The primary coil winding and the secondary coil winding therefore can, for example, consist of high-frequency litz wire.

The device according to the present invention can be configured such that it serves exclusively for transmitting electrical energy from a wall to wing attached to the wall in a hinged manner about the hinge axis and not for transmitting mechanical forces. The actual fastening of the wing to the wall is carried out in such a case exclusively by means of two further conventional hinges. Viewed radially inward from the inner jacket surface, the primary and the secondary coil bodies can then be formed in a solid manner.

In an embodiment of the present invention, the primary and secondary coil housings can, for example, comprise, in each case, an opening which extends approximately concentric to the inner jacket surface in the direction of the hinge axis and through which a hinge bolt defining the hinge axis can be inserted. The device can also serve to transmit mechanical forces in addition to transmitting power, and can thus at the same time assume the conventional hinge function.

In order that the bolt, for further improvement of the inductive coupling, also acts as a core of a transformer formed by means of the primary coil and the secondary coil, the bolt has a sleeve with ferrimagnetic or ferromagnetic properties and extending over the length that is covered by the primary and secondary coils, said sleeve containing, for example, a manganese-zinc-ferrite material. The length of said sleeve can, for example, be matched as exactly as possible to the length covered by the primary and the secondary coils so as to avoid losses.

The sleeve can be slid onto the bolt. The sleeve can, for example, be provided in a recess extending concentric to the longitudinal axis of the bolt. In this case, said sleeve can, for example, be made from a plastic material with particles having ferrimagnetic or ferromagnetic properties since in this manner, the unit consisting of bolt with sleeve can be produced in a particularly simple manner.

In order to provide a good inductive coupling between the primary coil and the secondary coil, at least one of the primary and secondary coils is mounted in a spring-loaded manner in the wall or the wing part so as to be pushable against the respective other coil in the direction of the hinge axis. This measure provides that the opposing end sides of the two coils are always in direct contact. This is of particular importance because it has surprisingly been found that even in the case of the bolt with the sleeve being present, even small gap dimensions result already in a significant deterioration of the power transmission from the primary coil to the secondary coil.

If the primary and the secondary coils are, for example, identical in construction, costs for production and storage of the coils can be reduced.

The present invention shall now be further illustrated with reference to the accompanying drawings.

The device designated as a whole with 100, 300 in the FIGS. 1 to 5 is designed as a so-called three-part hinge. Said device comprises an upper wall part 1 and a lower wall part 2. Both parts 1, 2 are spaced apart from each other in the direction of a hinge axis S.

Between the upper and the lower wall parts 1, 2, a wing part 3 is arranged.

The upper and lower wall parts 1, 2 comprise, in each case, a wall hinge part 4, 4' and a wall fastening part 5, 5'. The wing part accordingly comprises a wing hinge part 6 and a wing fastening part 7.

The hinge axis S is defined by a bolt 10 that penetrates the wall hinge parts 4, 4' and the wing hinge part 6 in bolt receptacles 8, 8' and 9. For bearing the bolt 10 in the bolt receptacles 8, 8', 9, bearing bushes 11, 11' and 12 are used which are made from a plastic material, for example, on the basis of POM with slide-bearing-modifying additives, which material has proven to be suitable for the use as bearing bush for hinges. The bearing bushes 11, 11', 12 have radial projections 13 that extend parallel to the hinge axis S. The diameter of the circle connecting the radial projections 13 to each other is adapted to the inner diameter of the bolt receptacles 8, 8', 9 in such a manner that the bearing bushes 11, 11', 12 engage in the respective bolt receptacle without play. On the upward-directed end of the bearing bush of the lower wall part 2, on the upper end of the bearing bush 11 of the upper wall part 1 and on the lower end of the bearing bush 12 of the wing part 3, annular end regions 14 are formed which slightly protrude the radial projections 13 in the radial direction. The end regions rest in an appropriately dimensioned radial widening 15 of the respective bolt receptacle 8, 8', 9 and thus close the bolt receptacles from the outside so as to prevent penetration of contaminants. The end regions 14 of the bearing bushes 11' of the lower wall part 2 and of the bearing bush 12 of the wing part 3 moreover form supports through which forces acting in the direction of the hinge axis are transmitted from the wing part 3 into the lower wall part 2. The bearing bushes 11, 11', 12 also have inner bores 16, the diameters of which are adapted to the diameter of the bolt 10 such that said bolt is received in the bearing bushes 11, 11', 12 in a rotatable and at least substantially play-free manner.

The lower closure of the lower wall part 2 is formed by a bearing washer 17, the dimensions of which correspond to the end regions 14 and which is inserted into a radial widening 15 of the lower wall part.

The length of the bearing bush 11' corresponds almost to the length of the bolt receptacle 8' of the lower wall part 2, whereas the bearing bushes 11, 12 are only half as long as the bolt receptacle 8 of the upper wall part 1 and the bolt receptacle 9 of the wing part 3, respectively. In the remaining free space of the bolt receptacles 8, 9, a primary coil 19 and a secondary coil 20 are inserted. Between the primary coil 19 and the bearing bush 11 and between the secondary coil 20 and the bearing bush 12 there is in each case a compression spring 18, 18'. These compression springs make sure that the two primary and secondary coils 19, 20 rest against each other with their end sides 21, 22, as is shown in particular in the FIGS. 2, 5 and 6.

The primary coil 19 and the secondary coil 20 are identically formed; however, they are mounted in the opposite direction with regard to the hinge axis S. They comprise a primary coil housing 23 and a secondary coil housing 24 made from a plastic material in which manganese-zinc-ferrite particles are embedded. On their end sides facing away from each other, the coil housings 23, 24 have in each case a closed outer end wall 25, 26 which is in each case penetrated by a central through-hole 48, 48' for passing through the hinge bolt. From the outer end walls 25, 26, in each case one inner jacket wall 27, 28 and in each case one outer jacket wall 29, 30 extend in opposite directions and concentric to the hinge axis S. The coil housings 23, 24 are open on the end sides 21, 22 opposite to the outer end walls 25, 26.

Inside the coil housings 23, 24 there are the primary and secondary coil windings 31, 32 which are wound around the inner jacket walls 27, 28. For the coil windings, suitable litz wires, for example, high-frequency litz wires, are used for the respective primary and secondary voltages and the respective primary and secondary currents and frequencies.

The coil housings 23, 24 are surrounded with an electrically-conductive shielding 33 that reduces escaping and penetrating of stray radiation.

Figure 3:
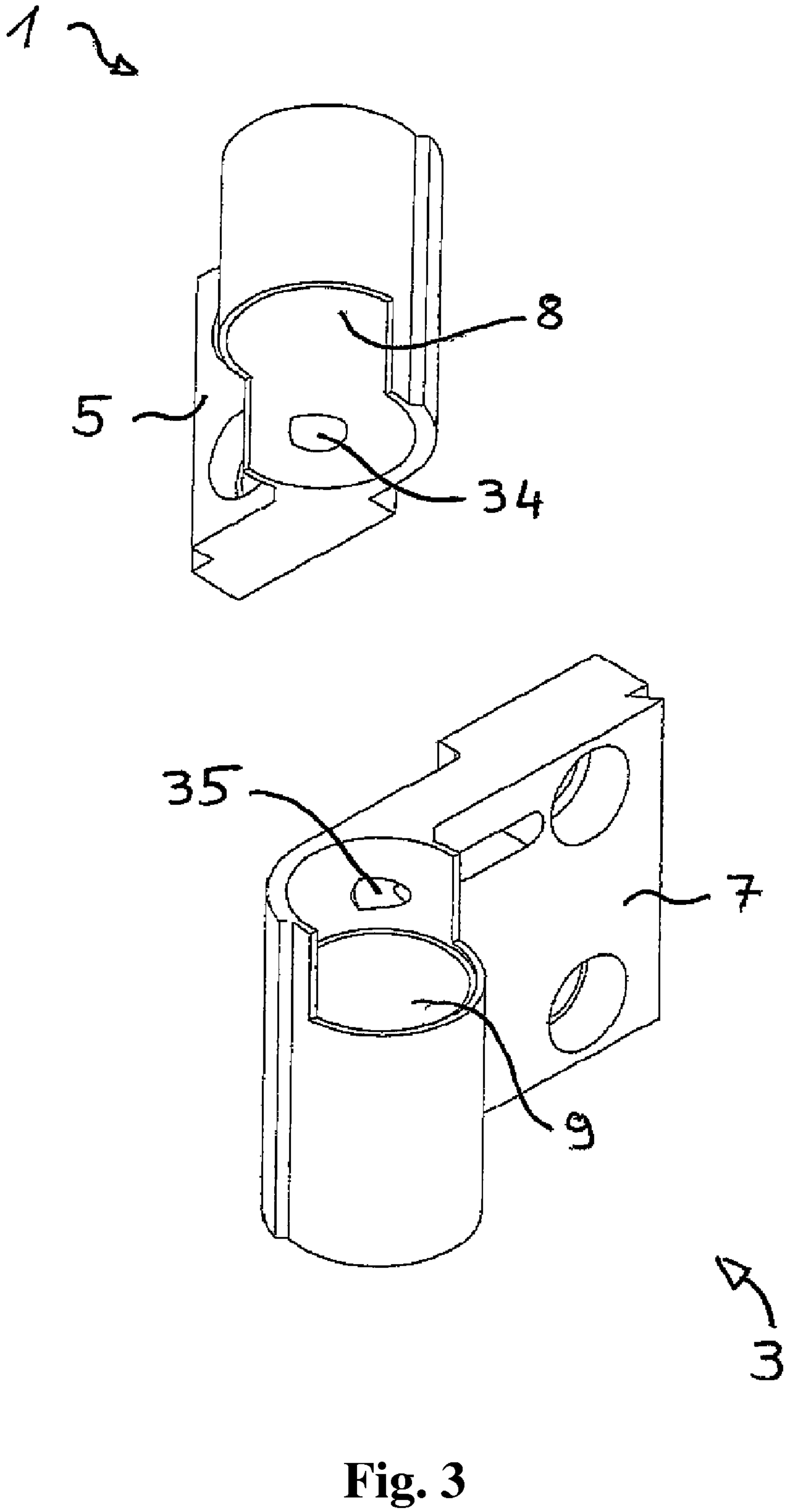
FIG. 3 shows the upper wall part and the wing part, partially cut-open, in a perspective detailed illustration.
Figure 4:
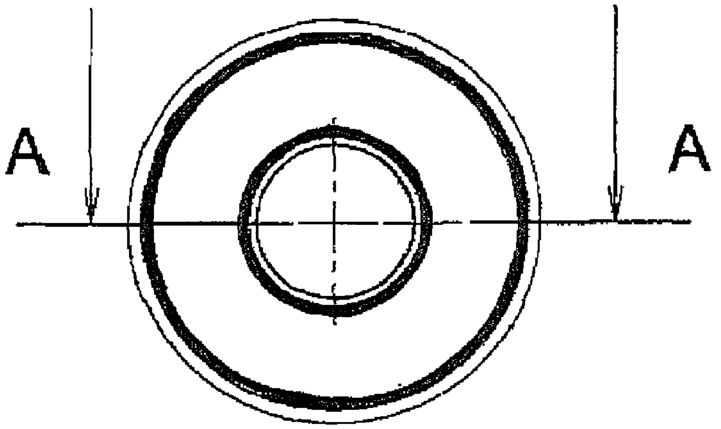
FIG. 4 shows a view of the open end side of a coil body.
Figure 5:
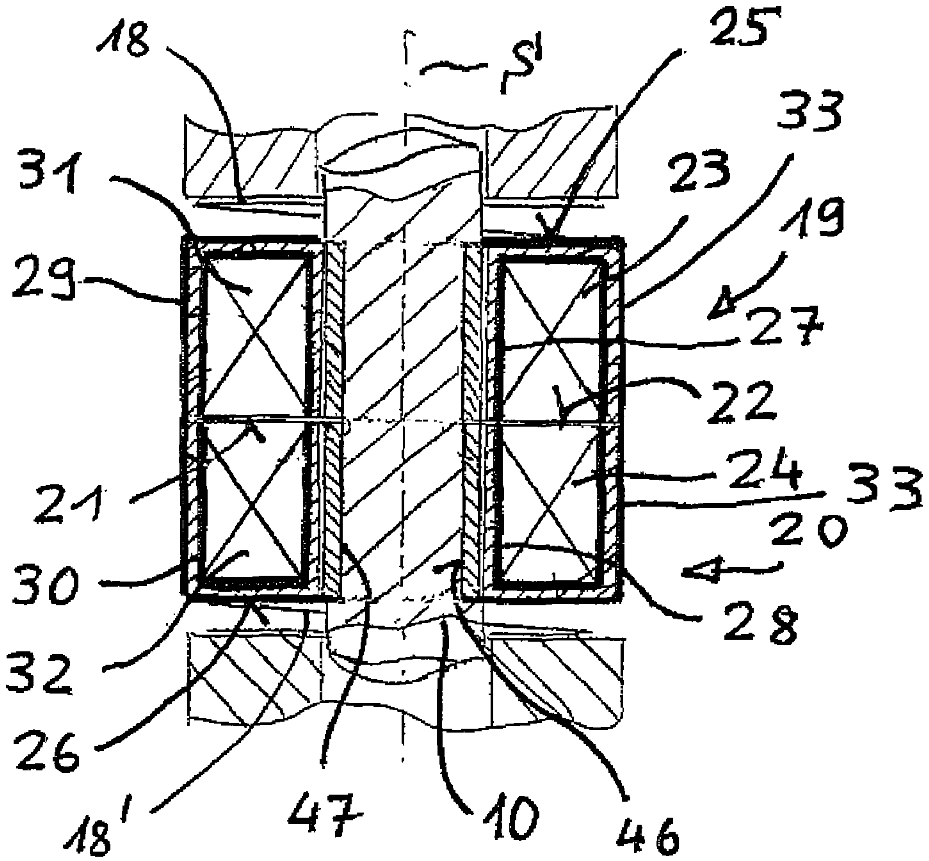
FIG. 5 shows the cut-out V in FIG. 2 in a section through the hinge axis.

As can be seen in particular in FIGS. 1 and 3, channels 34, 35 are provided in the upper wall part 1 and in the wing part 3, which channels extend from the hinge bolt receptacles 8, 9 into the wall fastening part 5 and the wing fastening part 7, respectively. They serve for passing through connecting lines 36, 37 of the primary and secondary coils 19, 20, respectively.

Figure 2:
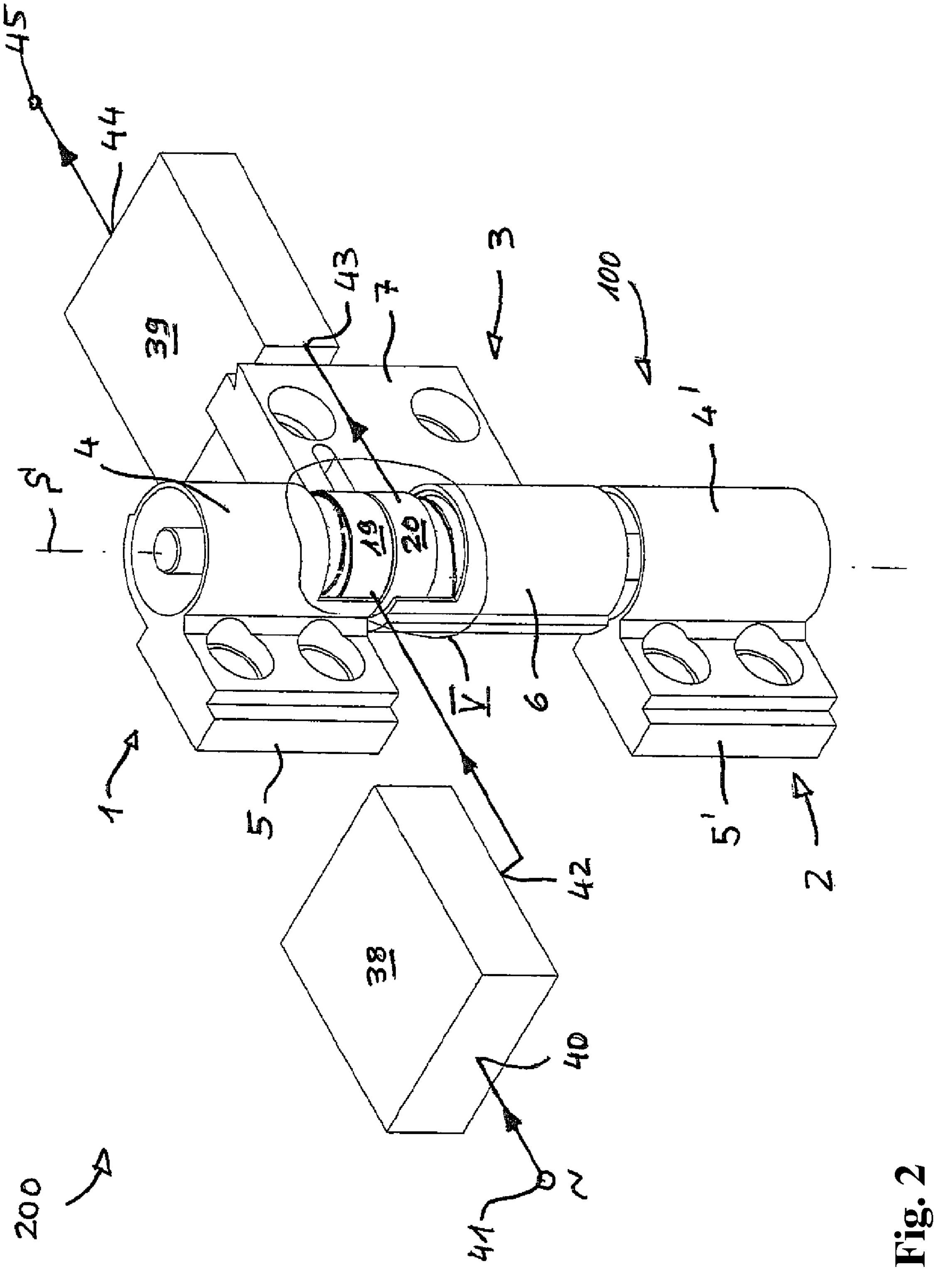
FIG. 2 shows this device in a partially cut-open illustration of the wall and wing parts in a perspective illustration, with schematically indicated primary and secondary electronics.

FIG. 2 illustrates a device 100 according to the present invention with a primary electronics 38 and a secondary electronics 39 of a system for transmitting electrical power from a wall to a wing attached to said wall. The primary electronics 38 of this system 200 is connected with its input 40 to a mains voltage 41. The primary electronics 38 converts the mains voltage 41 into a voltage of maximum 48 V and a frequency between 20 and 1 mHz, which is provided at the output 42. The latter is connected to the primary coil 19.

Since the primary and secondary coils 19, 20 are formed identically, the voltage present at the input 43 of the secondary electronics 39 that is connected to the secondary coil 20 is approximately the same voltage that is present at the output 42. In the secondary electronics 39, this voltage is converted into such a voltage that is suitable for operating an electric consumer or an electrical energy storage device 45 connected to the output 44 of the secondary electronics 39.

In order to improve the inductive coupling between the primary coil 19 and the secondary coil 20, the bolt 10 has a recess 46 that runs concentric to the hinge axis S. In this recess, there is a sleeve 47 made from a plastic material in which particles from a manganese-zinc-ferrite material are embedded. The length of the sleeve 47 is dimensioned such that it matches at least almost exactly the length of the coil packet consisting of primary and secondary coils 19, 20.

The system according to the invention has been tested with the following test setup: Coils with a coil winding of 30 windings of a litz wire with a diameter of 0.8 mm were used as primary and secondary coils. The effective primary voltage provided with the primary electronics was approximately 12 V with a primary frequency of 50 kHz. The secondary electronics was designed such that it provided a direct current voltage of approximately 12 V to 24 V at the output. A power output of more than 10 W could be provided on the secondary side.

Figure 6:
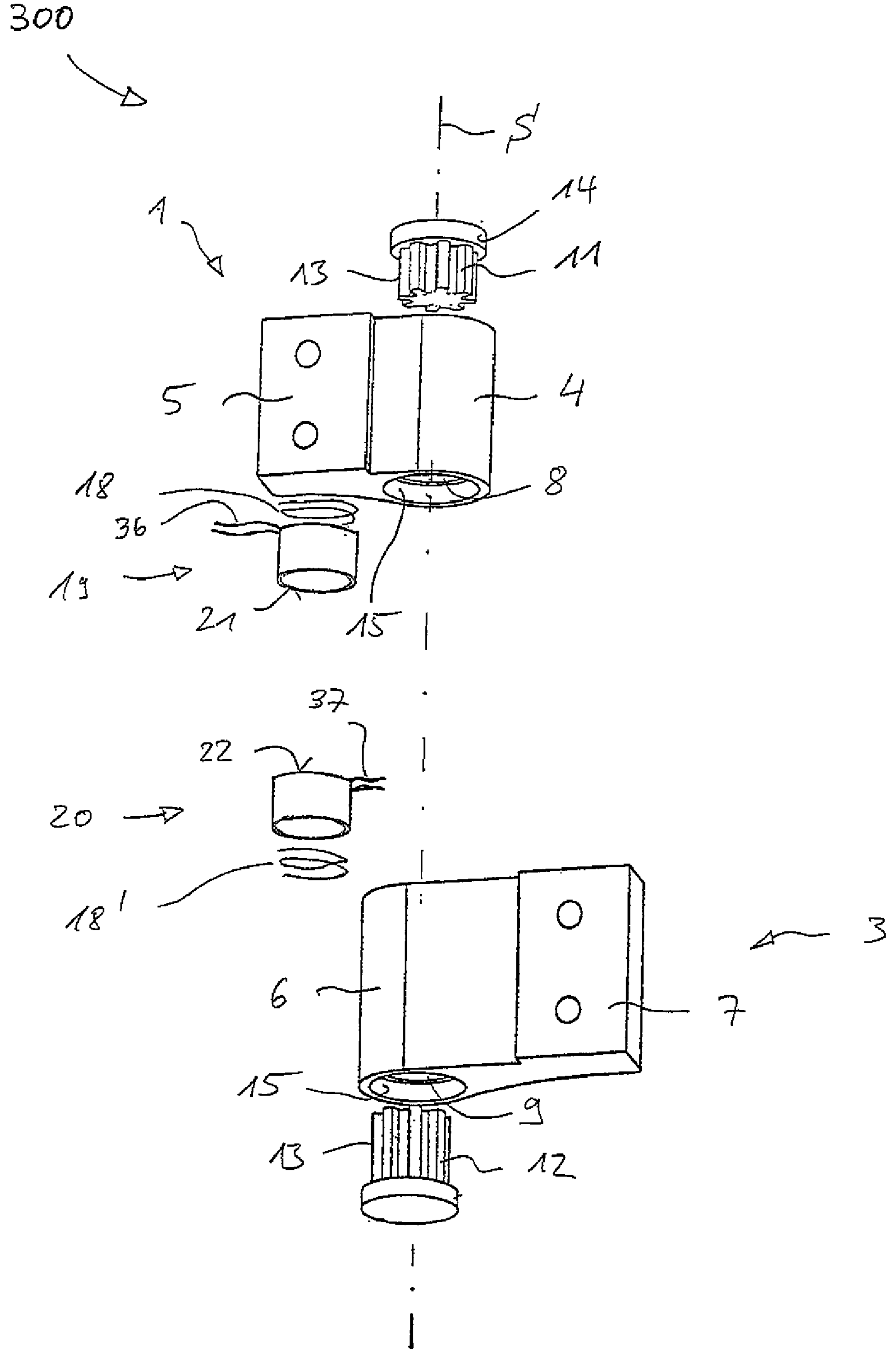
FIG. 6 shows an exploded illustration of a further embodiment of the device according to the present invention which serves only for transmitting electrical power from a wall into a wing.

A further exemplary embodiment of a device 300 according to the invention is illustrated in FIG. 6. For functionally identical components, the same reference numbers have been used as for the device 100. In order to avoid repetitions, reference is made to the above description thereof.

The device 300 serves exclusively for transmitting electrical power from a wall part 1 into a wing part 3. Said device is therefore always used in addition to conventional hinges of a wall/wing arrangement.

This device 300 thus has no bolt 10. Accordingly, the bearing bushes 11, 12 are not provided with a bore. The bearing bushes are adapted to the bolt receptacles 8, 9 in such a manner that they can be pressed into said receptacles thereby generating a frictional connection so that the compression springs 18, 18' can be supported on the end sides facing said compression springs.

The primary and secondary coils 19, 20 thus have coil housings which, in contrast to the coil bodies of the device 100, have no central through-hole for passing through the bolt, but are formed as solid bodies.

If the device according to the invention is attached to a wall/door arrangement comprising conventional hinges, this is carried such that the hinge parts 4, 6 do not abut against each other with their end sides facing each other, but that a gap remains which is bridged by the primary and secondary coils which, on their end sides, are pressed against each other under spring load. Since in absence of a penetrating bolt, these coils can also be displaced transverse to the hinge axis S, aligning the wing in the wall section can be carried out in all three spatial directions without the need of a special adjustment of the device.

The present invention is not limited to embodiments described herein; reference should be had to the appended claims.

REFERENCE LIST

100, 300 Device
200 System
1 Upper wall part
2 Lower wall part
3 Wing part
4, 4' Wall hinge part
5, 5' Wall fastening part
6 Wing hinge part
7 Wing fastening part
8, 8' Bolt receptacle
9 Bolt receptacle
10 Bolt
11, 11' Bearing bush
12 Bearing bush
13 Radial projections
14 End regions

15 Radial widening
16 Inner bores
17 Bearing washer
18, 18' Compression spring
19 Primary coil
20 Secondary coil
21 End side
22 End side
23 Primary coil housing
24 Secondary coil housing
25 Outer end wall
26 Outer end wall
27 Inner jacket wall
28 Inner jacket wall
29 Outer jacket wall
30 Outer jacket wall
31 Primary coil winding
32 Secondary coil winding
33 Shielding
34 Channel
35 Channel
36 Connecting line
37 Connecting line
38 Primary electronics
39 Secondary electronics
40 Input
41 Mains voltage
42 Output
43 Input
44 Output
45 Consumer/energy storage device
46 Recess
47 Sleeve
48, 48' Through-holes

What is claimed is:

1. A device for transmitting electrical power from a fixed wall to a wing attached to the fixed wall in a hinged manner about a hinge axis, the device comprising:

a wall part configured to be fastened to the fixed wall;

a wing part configured to be fastened to the wing;

a primary coil arranged on the wall part, the primary coil comprising an end side, a primary coil winding and a primary coil housing with ferromagnetic or ferrimagnetic properties, the primary coil housing being configured to be open on an end side facing the wing part and to substantially cover the primary coil winding on an opposite end side; and a secondary coil arranged on the wing part, the secondary coil comprising a secondary coil winding and a secondary coil housing with ferrimagnetic or ferromagnetic properties, the secondary coil housing being configured to be open on an end side facing the wall part and to substantially cover the secondary coil winding on an opposite end side;

wherein, the end side of the primary coil and the end side of the secondary coil are arranged so as to face each other, and at least one of the primary coil and the secondary coil is mounted in a spring-loaded manner in the wall part or in the wing part so as to be pushable against the respective other primary coil or secondary coil in a direction of the hinge axis.

2. The device as recited in claim 1, wherein at least one of the primary coil housing and the secondary coil housing comprises an inner jacket wall around which the respective primary coil winding and secondary coil winding is wound.

3. The device as recited in claim 2, wherein the inner jacket wall is formed cylindrically.

4. The device as recited in claim 2, wherein at least one of the primary coil housing and the secondary coil housing comprises an outer jacket wall which is arranged so as to be concentric to the inner jacket wall.

5. The device as recited in claim 2, further comprising a bolt, wherein the primary coil housing and the secondary coil housing each comprise an opening which extends approximately concentric to the inner jacket wall in a direction of the hinge axis and through which the bolt defining the hinge axis is insertable.

6. The device as recited in claim 5, wherein, on a length that is covered by the primary coil and by the secondary coil, the bolt comprises a sleeve with ferromagnetic properties or ferromagnetic properties.

7. The device as recited in claim 6, further comprising a recess which extends concentric to a longitudinal axis of the bolt, wherein the sleeve is provided in the recess.

8. The device as recited in claim 6, wherein the sleeve comprises a plastic material comprising ferrite particles.

9. The device as recited in claim 8, wherein the ferrite particles contain a manganese-zinc-ferrite material.

10. The device as recited in claim 1, wherein at least one of the primary coil housing and the secondary coil housing are formed in one piece from at least one of plastic-containing ferrimagnetic particles and plastic-containing ferromagnetic particles.

11. The device as recited in claim 10, wherein the at least one of plastic-containing ferrimagnetic particles and plastic-containing ferromagnetic particles comprise a manganese-zinc-ferrite material.

12. The device as recited in claim 1, wherein at least one of the primary coil housing and the secondary coil housing further comprise an electrically-conductive shielding.

13. The device as recited in claim 12, wherein at least one of the primary coil housing and the secondary coil housing further comprise an outer surface, the electrically-conductive shielding comprises an electrically-conductive coat or an electrically-conductive layer which is arranged on the outer surface of the at least one of the primary coil housing and the secondary coil housing.

14. The device as recited in claim 1, wherein the primary coil winding and the secondary coil winding consist of litz wires suitable for a primary voltage, a secondary voltage, primary currents and frequencies, and a secondary currents and frequencies.

* * * * *